United States Patent [19]
Ohmae

[11] Patent Number: 5,005,425
[45] Date of Patent: Apr. 9, 1991

[54] VORTEX FLOWMETER

[75] Inventor: Katsuhiko Ohmae, Hyogo, Japan

[73] Assignee: Mitsubishi Denki Kabushiki Kaisha, Tokyo, Japan

[21] Appl. No.: 340,602

[22] Filed: Apr. 19, 1989

[30] Foreign Application Priority Data

| Apr. 16, 1988 | [JP] | Japan | 63-97872 |
| Apr. 19, 1988 | [JP] | Japan | 63-97868 |
| Apr. 19, 1988 | [JP] | Japan | 63-97870 |
| Apr. 19, 1988 | [JP] | Japan | 63-97871 |

[51] Int. Cl.$^5$ .............................................. G01F 1/32
[52] U.S. Cl. ............................... 73/861.22; 73/861.23
[58] Field of Search .................... 73/861.22, 861.23; 307/520, 522, 524; 328/137, 138, 140, 167

[56] References Cited

U.S. PATENT DOCUMENTS

| 3,522,449 | 8/1970 | McMurtrie | 307/243 |
| 3,638,037 | 1/1972 | McMurtrie | 328/167 |
| 3,709,034 | 1/1973 | Herzl | 307/520 |
| 4,270,391 | 6/1981 | Herzl | 73/861.22 |
| 4,318,303 | 3/1982 | Harrington | 73/861.23 |
| 4,432,242 | 2/1984 | Thompson | 73/861.22 |
| 4,545,258 | 10/1985 | Coursolle | 73/861.22 |

Primary Examiner—Herbert Goldstein
Attorney, Agent, or Firm—Sughrue, Mion, Zinn, Macpeak and Seas

[57] ABSTRACT

A vortex flowmeter comprises a bank of filter sets (12) each for receiving a vortex signal produced according to the flow rate of a fluid to be measured, a waveform shaping circuit (13) for shaping an output of a selected one of the filter sets, a filter set switch decision circuit (14) for switching from one filter set to another by measuring the vortex frequency from an output of the waveform shaping circuit, and a switch circuit (15) responsive to a decision made by the filter set switch decision circuit to switch the filter set to thereby remove noise and beat components contained in the vortex signal.

3 Claims, 10 Drawing Sheets

FIG. 1

FIG. 2a INPUT WAVEFORM OF FILTER SET 12

FIG. 2b OUTPUT WAVEFORM OF FILTER SET 12

FIG. 13 PRIOR ART

VORTEX FLOWMETER

BACKGROUND OF THE INVENTION

The present invention relates to a vortex flowmeter and, particularly, to a vortex flowmeter for air to be supplied to an internal combustion engine, which includes low pass and high pass filters for removing noise components and beat components from vortex a signal so that the vortex frequency can be detected exactly with high response.

Figure 13:
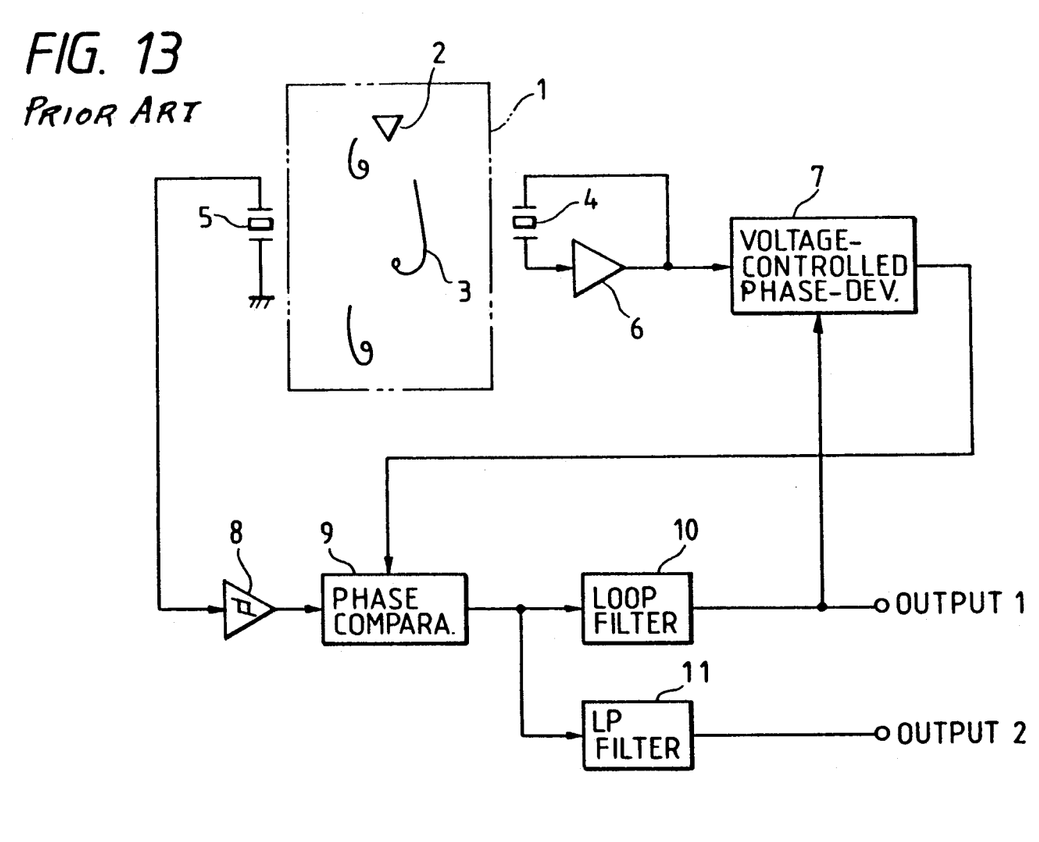
FIG. 13 is a block diagram of a conventional vortex flowmeter.

FIG. 13 is a block circuit of an example of a conventional vortex flowmeter of this type which is disclosed in Japanese Patent Publication No. 56415/1983. In FIG. 13, an ultrasonic vibrator 4 and an ultrasonic receiver 5 are disposed in facing relation through a flowmeter 1 having a vortex generating member 2 and the ultrasonic vibrator 4 is driven by an ultrasonic oscillation circuit 6 such that ultrasonic waves therefrom propagate across a flow of Karman vortexes 3 produced in a downstream side of the vortex generating member 2.

Ultrasonic waves traversing the Karman vortex flow 3 are phase-modulated thereby and received by the ultrasonic receiver 5. The received signal is shaped by the waveform shaping circuit 8 and supplied to a phase comparator 9.

On the other hand, an output of the ultrasonic oscillator circuit 6 is supplied to a voltage controlled phase deviation circuit 7 having functions of controlling only phase deviation angle while keeping a high stability of ultrasonic oscillation frequency signal.

The output of the ultrasonic oscillation circuit 4 which is phase-deviated by the voltage controlled phase deviation circuit is supplied to the phase comparator 9.

The phase comparator 9, the ultrasonic oscillation circuit 6, the voltage controlled phase deviation circuit 7 and a loop filter 10 constitute a phase synchronizing loop. A reference numeral 11 depicts a low-pass filter.

The phase comparator 9 compares, in phase, the output of the waveform shaping circuit 8 with the output of the voltage controlled phase deviation circuit 7 and supplies a result of comparison to the loop filter 10 in which undesired frequency components are removed.

The voltage controlled phase deviation circuit 7 also responds to an output voltage of the loop filter 10 to control a phase deviation angle of the output signal of the ultrasonic oscillation circuit 6 and the phase comparator 9 is supplied with an output of the voltage controlled phase deviation circuit 7, the latter output being synchronized with the ultrasonic receiving signal. As a result, the output of the low pass filter 11 becomes a phase demodulated output.

In this case, however, the vortex frequency is disturbed by high frequency noise and/or low frequency beat dependent upon flow conditions of the fluid to be detected.

In order to solve this problem, Japanese Patent Publication No. 15045/1983 proposes another Karman vortex flowmeter for an automobile. In this Karman vortex flowmeter, a vortex signal produced corresponding to flow rate or flow speed of the fluid is amplified by an amplifier and filtered by a frequency variable filter whose pass band is controlled corresponding to an information of running conditions of an engine, so that only a true vortex frequency is detected.

In Japanese Utility Model Publication No. 18332/1984 a vortex signal produced is detected by a piezo sensor and, after being converted into an a.c. signal voltage, filtered by a low-pass filter which is an active filter composed of an operational amplifier and an impedance element. When an output of the operational amplifier exceeds a predetermined level, a filter function of the filter is removed.

Further, in Japanese Patent Publication No. 24363/1984, first and second sensors are provided on a Karman vortex generator and outputs of the sensors are supplied to first and second converter/amplifiers, respectively. An addition or subtraction of outputs of the first and the second converter/amplifiers is performed by an operation device whose output is filtered by a filter circuit having low-pass characteristics. An output of this filter circuit is converted into a pulse width signal so that, when the output signal of the operation device exceeds a predetermined level, the filter characteristic of the filter circuit is lost.

That is, in the last two cases, S/N ratio is maintained by inserting the filter function into the circuit, intermittently.

However, in the case of 15045/1983, the frequency control of the frequency variable filter circuit is performed by a control system of an engine. Therefore, there are problems that the control system becomes complicated and the flowmeter itself cannot function independently.

In each of 18332/1984 and 24363/1984, when the output of the operational amplifier constituting a filter exceeds the predetermined level, a switching operation is required to remove the filter characteristics. Therefore, it is impossible to obtain a sufficient S/N ratio.

SUMMARY OF THE INVENTION

An object of the present invention is to obtain an inexpensive, accurate vortex flowmeter having high response and capable of detecting a desired vortex frequency by removing noise components and/or beat components superimposed on the vortex frequency.

In order to achieve the above object, a vortex flowmeter according to the present invention comprises, in addition to the components shown in FIG. 13, a bank of filter sets each for receiving a vortex signal produced according to the flow rate of fluid to be measured, a waveform shaping circuit for shaping an output of a selected one of the filter sets, a filter set switch decision circuit for deciding a switching of one filter set to another by frequency measurement of a vortex frequency from an output of the waveform shaping circuit and a switch circuit responsive to a decision made by the filter set switch decision circuit to switch the filter set.

In the present invention, a vortex signal produced corresponding to the flow rate of fluid to be measured and passed through a low pass filter is supplied to one of the filter sets of the filter bank to remove undesired noise components thereof and a noise-removed vortex signal from the selected filter set of the filter bank is, after being shaped by the waveform shaping circuit, supplied to the filter switch decision circuit in which it is checked whether noise still exists and whether the selected filter set should be changed to another to remove such noise. Upon the decision, the filter set is switched by the switching circuit to block noise frequency.

According to another embodiment of the present invention, each filter set comprises a low pass filter for removing noise of a vortex signal, a limiter circuit for limiting an output voltage of the low pass filter, a switch for on-off controlling an output voltage of the limiter circuit, a high pass filter for removing beat components of the vortex signal and a combiner for combining outputs of the switch and the high pass filter.

The low pass filter in this embodiment removes noise superimposed on the vortex signal. After an output voltage of the low pass filter is limited by the limiter circuit, it is on-off controlled by the switch and supplied to the combiner together with the output of the high pass filter which has no beat component. A desired vortex frequency is detected by combined outputs of the high pass filter and the switch.

According to a further embodiment of the present invention, each filter set comprises a low pass filter for removing noise of a vortex signal, a high pass filter for removing beat component of the vortex signal, a switch circuit for switching an output between the low pass filter and the high pass filter and a voltage detector circuit for detecting an output voltage of the switch circuit to drive the latter.

The low pass filter in this embodiment removes noise superimposed on the vortex signal and the high pass filter removes beat components of vortex signal. The switch circuit switches between the low pass filter and the high pass filter and a voltage of the switch circuit is detected by the voltage detector circuit to forcibly drive the switch circuit to the side of the high pass filter when this voltage exceeds a predetermined voltage.

According to another embodiment of the present invention, a pulsation detector is used instead of the filter set switch decision circuit, which comprises a one-shot circuit responsive to a leading edge of the output of the waveform shaping circuit to provide a one-shot pulse, a first counter for counting reference clock pulses within a period of the one-shot pulse, a decoder for determining whether an output of the first counter is higher or lower than a judge frequency, a latch circuit for latching a judge made by the decoder, a flip-flop adapted to be set to switch a switch circuit to thereby switch the filter set when an existence of pulsation is determined where the output of the latch circuit is higher than the judge frequency and to thereby not switch the filter set when pulsation is absent where the output of the latch circuit is lower than the judge frequency and a second counter adapted to be cleared when the output of the latch circuit is higher than the judge frequency and to count the reference pulses and supply to the flip-flop when the output of the latch circuit is lower than the judge frequency. The one-shot circuit in this embodiment produces a one-shot pulse at a leading edge of an output of the waveform shaping circuit, whose period is detected by counting reference clocks by the first counter. It is determined by the decoder whether an output of the first counter is higher or lower than a decoder judge frequency and a result is latched by the latch circuit. When the output is higher than the judge frequency, the flip-flop outputs an output indicating an existence of pulsation. When it is lower than the judge frequency, the second counter counts the reference clocks and sends a result to the flip-flop to derive an output indicating an absence of pulsation therefrom.

DETAILED DESCRIPTION OF THE PREFERRED EMBODIMENTS

Figure 1:
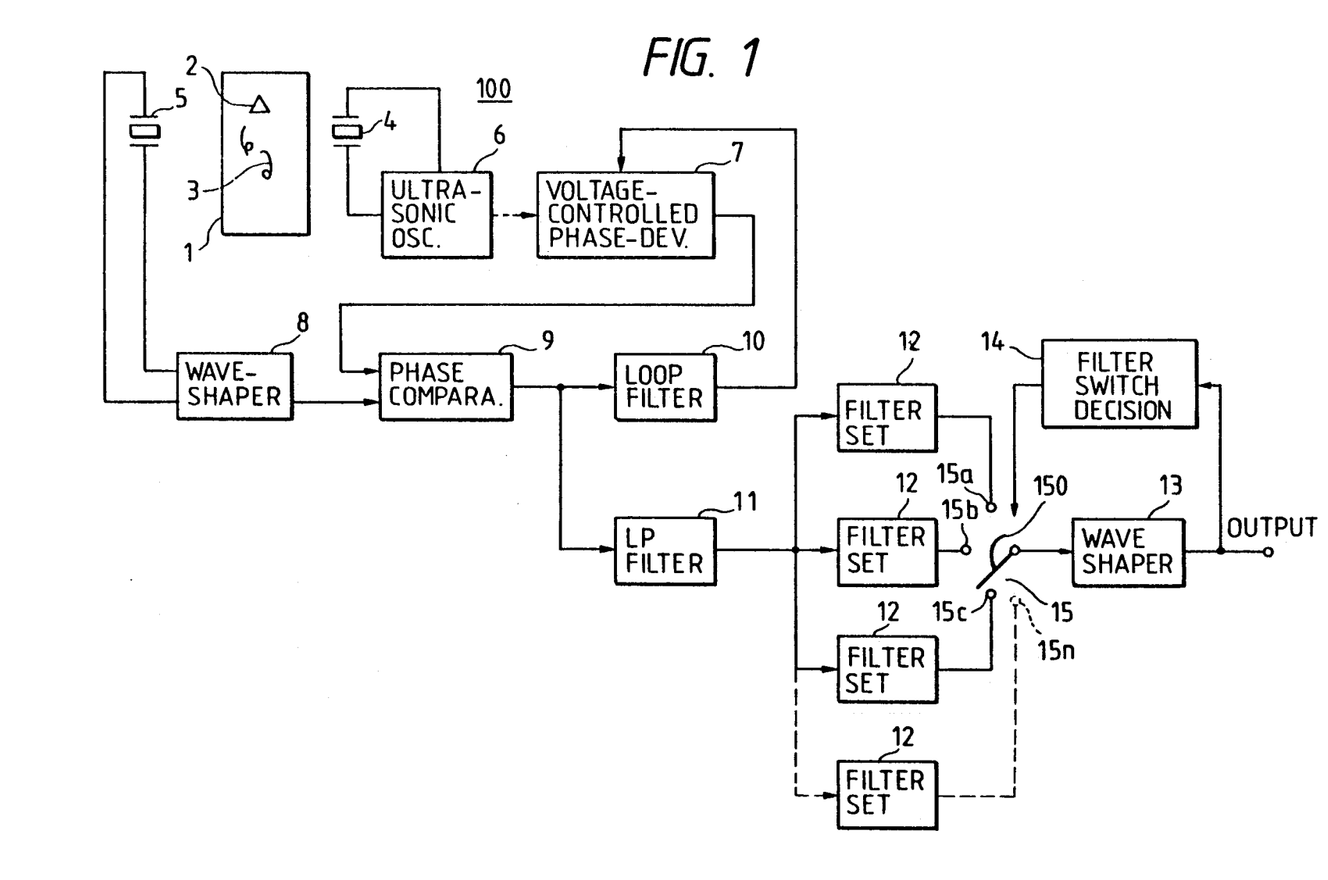
FIG. 1 is a block circuit diagram of a vortex flowmeter according to an embodiment of the present invention.

An embodiment of a vortex flowmeter of this invention will be described with reference to the drawings. FIG. 1 is a block circuit diagram showing a construction of the embodiment. In FIG. 1, same components as those in FIG. 13 are depicted by same reference numerals and described briefly and portions different from those shown in FIG. 13 will be described in detail.

In FIG. 1, a vortex generator 2 is provided on a flowmeter 1 such that a series of Karman vortexes 3 are produced in a downstream side of the vortex generator 2. An ultrasonic vibrator 4 and an ultrasonic receiver 5 are arranged in facing relation through the flowmeter 1 in a position corresponding to a position in which the Karman vortexes 3 are produced.

The ultrasonic vibrator 4 is driven by an output signal of an ultrasonic oscillator circuit 6 and ultrasonic waves produced by the ultrasonic vibrator 4 driven by the output signal are received by the ultrasonic receiver 5 through the flowmeter 1. In this case, the ultrasonic waves are phase-modulated by Karman vortexes 3.

The phase-modulated ultrasonic wave received by the ultrasonic receiver 5 as mentioned is converted therein into an electric sinal which is supplied to a waveform shaping circuit 8 and then to a phase comparator 9.

On the other hand, the output signal of the ultrasonic oscillator circuit 6 is supplied to a voltage controlled the phase deviation circuit 7. The voltage controlled phase deviation circuit 7 deviates phase of the output of the ultrasonic oscillator circuit 6 by an output voltage of a loop filter 10 and sends it to the phase comparator 9.

The phase comparator 9, the loop filter 10, the ultrasonic vibrator 4 and the ultrasonic oscillator circuit 6 constitute a phase synchronizing loop, in which the output of the voltage controlled phase deviation circuit 7 is synchronized by the output of the loop filter 10 with the output of the waveform shaping circuit 8, i.e., ultrasonic receiving signal, resulting in a phase demodulated output from the loop filter 10. Thus, the components depicted by reference numerals 1 to 11 constitute vortex signal detection means 100 for vortex signals produced according to the flow rate of fluid to be measured.

The construction and operation mentioned above are the same as those shown in FIG. 13. The following is the portion which is different from that shown in FIG. 13 and constitutes a feature of the present invention.

That is, the output of the phase comparator 9 is supplied to the loop filter 10 directly and to the bank of filter sets 12 indirectly through the low pass filter 11. The output of the filter bank is supplied to the waveform shaping circuit 13.

A Karman vortex frequency signal corresponding to flow rate in the flowmeter 1 is provided by the waveform shaping circuit 13, which is supplied to a filter switch decision circuit 14. A judgement from the circuit 14 is supplied to a switch circuit 15. The switch circuit 15 includes fixed terminals 15a to 15n connected to the respective filter sets 12 of the filter bank and a movable terminal 150 connected to the waveform shaping circuit 13 so that the movable terminal 150 is controlled by the output of the filter switch decision circuit 14 to supply the output of a related one of the filter sets to the waveform shaping circuit 13. The filter sets 12 are switched by this switch circuit.

With this construction, a vortex signal produced according to the flow rate of fluid flowing through the flow-meter 1 and to be measured, i.e., phase demodulated signal, is supplied through the low pass filter 11 to the filter bank.

Figure 2A:
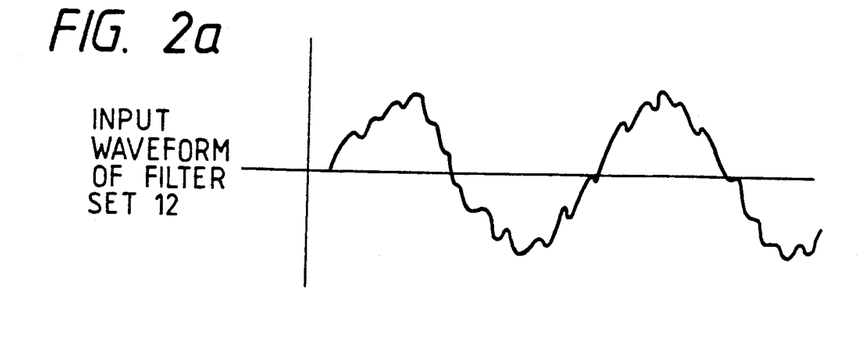
FIG. 2A is a waveform of an input signal to filters in the same embodiment.
Figure 2B:
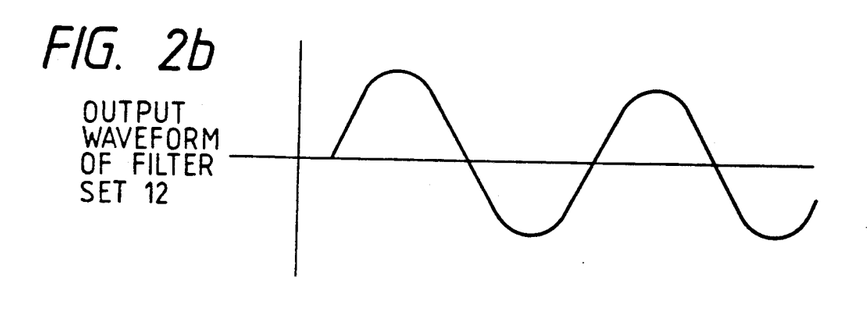
FIG. 2B is a waveform of an output signal of the same filters.
Figure 3:
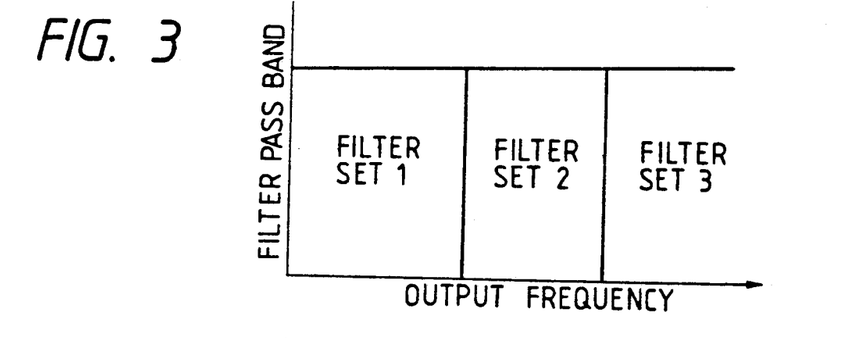
FIG. 3 shows a characteristic of a filter set with respect to an output frequency of the same filters.
Figure 4:
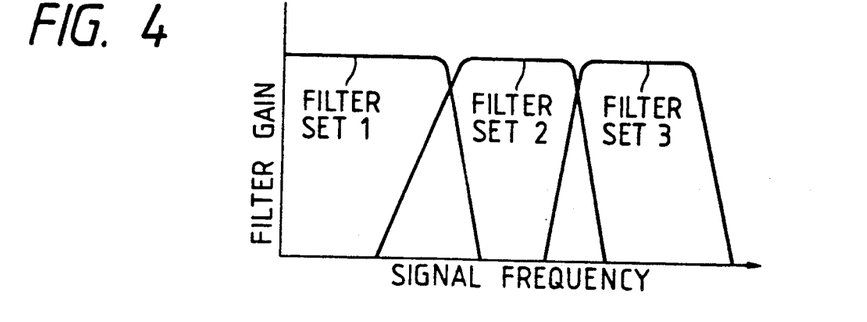
FIG. 4 is a filter characteristic of the same filters.

FIG. 2A shows the input waveform of a selected one of the filter sets 12 and FIG. 2B shows the output waveform thereof. The frequency characteristics of the filter sets 12 are shown in FIG. 3 and the switching of the filter sets is as shown in FIG. 4.

When the flow rate of air is low in such a case where the engine is idling, there is neither ultrasonic noise nor beat and a stable measuring of vortex frequency is possible. Therefore, it is possible to detect vortex frequency on the basis of this correct value.

Since the angle of the air valve or throttle is generally very small in engine idling, air passed through a flow-meter is converged at a valve portion (not shown) and then supplied to the engine, and pulsation or ultrasonic noise produced downstream of the air valve in the engine cannot be propagated upstream due to the effect of the convergence.

Therefore, a stable output of the flowmeter is obtained. Since, in a case where a pass band of the bank of filter sets 12 is determined on the basis of the frequency output thus obtained, the bank is switched from one filter to another filter with an increase of engine revolution and hence output frequency, and noise having frequencies other than the signal output frequency cannot pass through the bank of filters.

In the embodiment shown in FIG. 1, the output of the filter such as shown in FIG. 2B is shaped by the waveform shaping circuit 13 to obtain a vortex frequency output and the latter is supplied to the filter switch decision circuit 14 to judge whether or not a switching of the filter sets should be performed. A result is supplied to the switch circuit 15.

By controlling the pass band of the filter bank by switching the filter sets 12 by means of the switch circuit 15, noise having frequencies other than the signal output frequency is blocked by the filter sets 12, as mentioned previously.

Since the present invention is constructed such that a detection output of vortex signal, after passing through the filter bank, is shaped to perform a filter switch decision by means of the filter set switch decision circuit, upon which the filter set is switched to another to block noise component, it is possible to select a desired vortex frequency accurately and rapidly in inexpensive manner.

Figure 5:
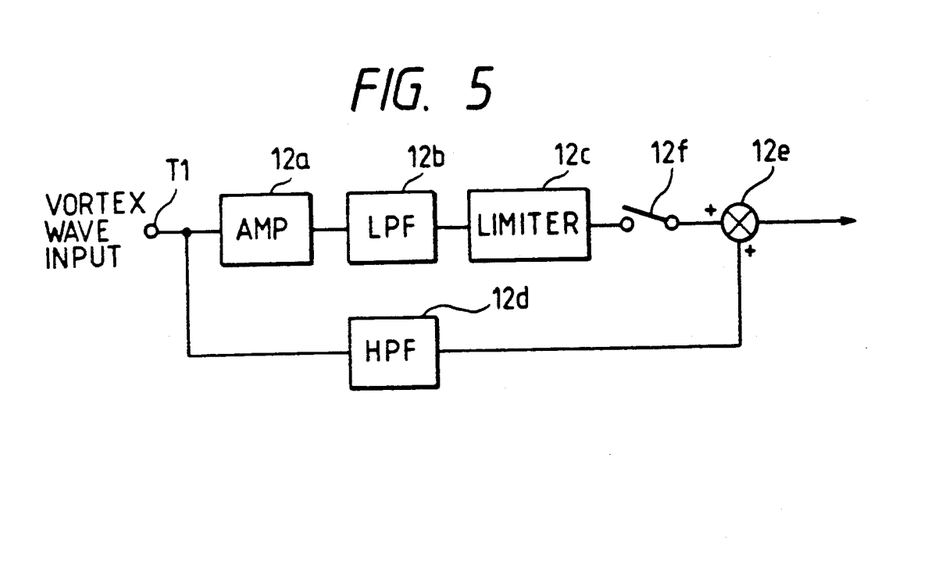
FIG. 5 is a block circuit diagram of a filter set according to the present invention.

FIG. 5 is a block circuit diagram of a filter set 12 according to the present invention. In FIG. 5, the output of the vortex signal detection means shown in FIG. 1, i.e., the vortex signal from the output terminal of the low pass filter 11 is supplied to an input terminal T1 of the filter set 12.

The vortex signal supplied to the terminal T1 is amplified by an amplifier 12a, filtered by a low pass filter 12b and supplied to a limiter circuit 12c. An output of the limiter 12c is supplied through a switch 12f to an input of a combiner 12e.

The vortex signal supplied to the terminal T1 is also passed through a high pass filter 12d.

The output of the limiter circuit 12c is made intermittent by the switch 12f. The combiner 12e combines the output of the switch 12f and an output of the high pass filter 12d to provide a vortex frequency signal having a predetermined frequency, which is supplied to the switch circuit 15 shown in FIG. 1.

In operation of the circuit in FIG. 5, the amplifier 12a amplifies a small vortex voltage obtainable when the vortex frequency is low and supplies it to the low pass filter 12b.

The low pass filter 12b removes noise signals contained in the small, the vortex voltage when vortex frequency is low and supplies a noise-removed signal to the limiter circuit 12c. The limiter circuit 12c limits the output signal amplitude of the low pass filter 12b to a constant voltage.

The output of the limiter circuit 12c is made intermittent by the switch 12f and then supplied to the combiner 12e. That is, the switch 12f functions to intermittently make a signal line between the output of the limiter circuit 12c and the combiner 12e.

On the other hand, the high pass filter 12d removes beat components of the vortex signal and supplies it to the combiner 12e. The combiner 12e combines the outputs of the high pass filter 12d and the switch 12f to provide a vortex signal having a predetermined frequency.

Figure 6:
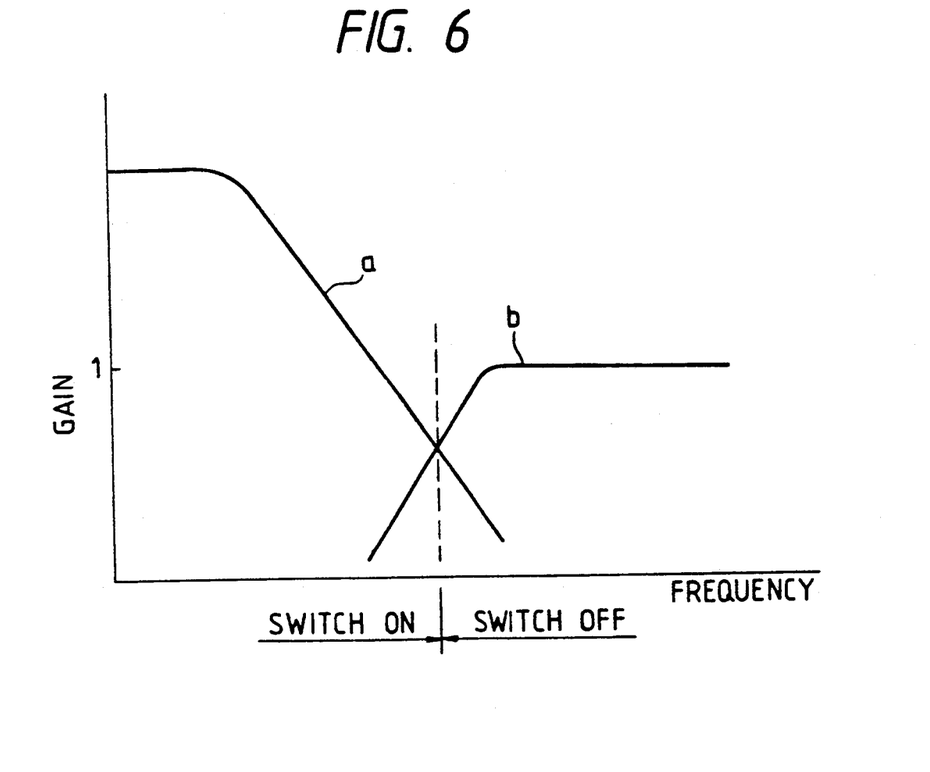
FIG. 6 shows characteristic curves of a low pass filter and a high pass filter in FIG. 5.

A characteristics a of a combination of the amplifier 12a and the low pass filter 12b and a charactristics b of the high pass filter 12d are as shown in FIG. 6. The low pass filter 12b removes noise components having frequency higher than the vortex frequencies and the high pass filter 12d removes beat components having frequencies lower than the vortex frequency.

A switching of the switch 12f depends upon the vortex frequency and occurs at a cross point on the characteristic curves of the low pass filter 12b and the high pass filter 12d as shown in FIG. 6.

Figures 7A, 7B:
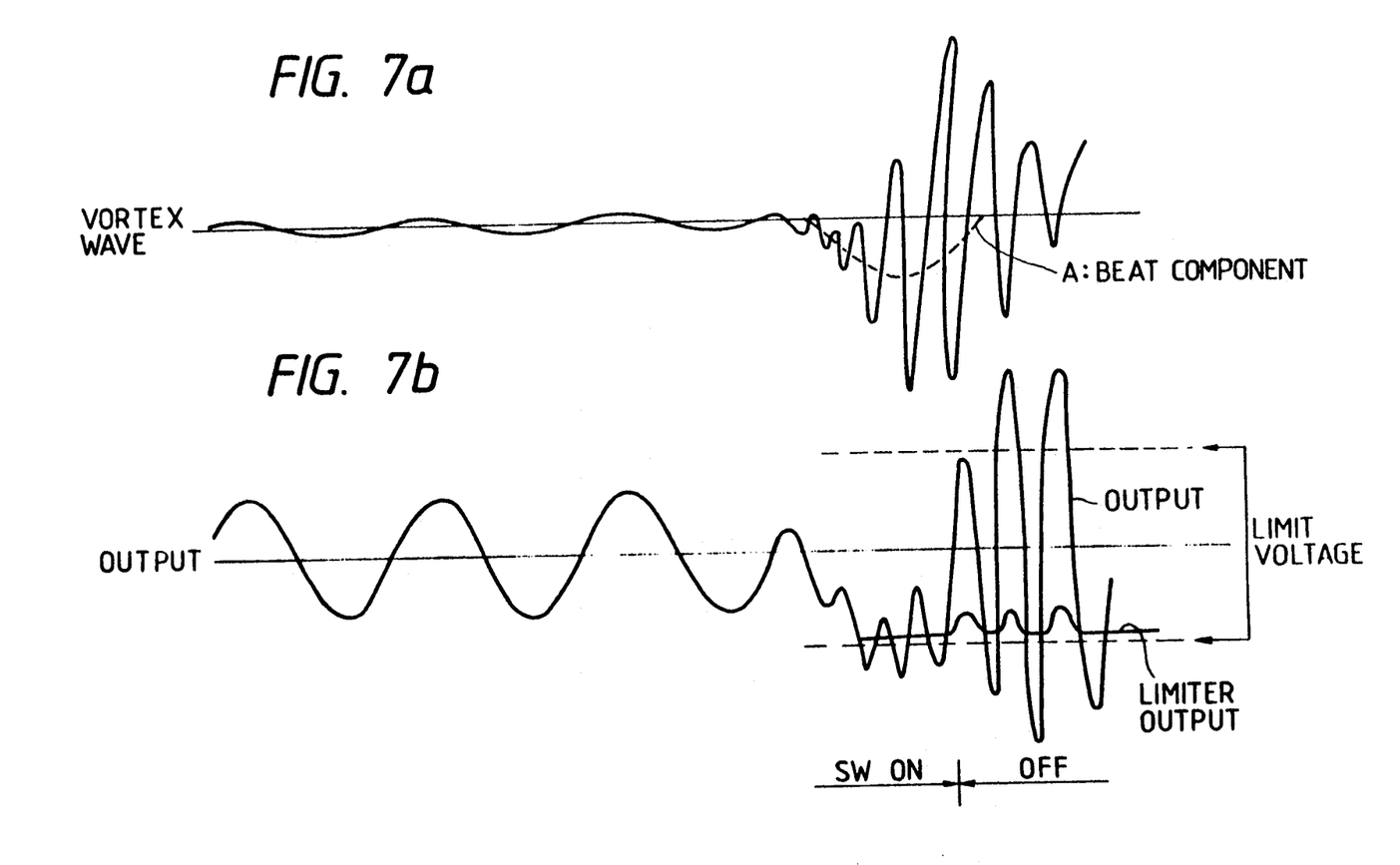
FIGS. 7A and 7B show waveforms for explanation of an operation of the filter circuit in FIG. 5.

Asumming that vortex signal frequency supplied to the input terminal T1 in FIG. 5 becomes high and the vortex signal includes a low frequency beat component A, as shown in FIG. 7a, the beat component A is amplified by the amplifier 12a. However, its amplitude is limited by the limiter circuit 12c, as shown in FIG. 7b.

On the other hand, the signal passed through the high pass filter 12d is combined by the combiner 12e with the signal whose amplitude is limited by the limiter circuit 12c. A resultant output signal is shown in FIG. 7b, whose signal waveform has no distortion.

Since a vortex signal having a predetermined frequency is obtained by removing noise components of the vortex signal by the low pass filter and limiting its amplitude by the limiter circuit to make it intermittent by the switch, and removing beat components thereof by the high pass filter and combining outputs of the high pass filter and the switch by a combiner, it is possible to remove noise components superimposed on the vortex frequency accurately and economically with high response without using other sensor or control system than the vortex flowmeter and to detect vortex frequency with high fidelity even when vortex frequency increases abruptly.

Figure 8:
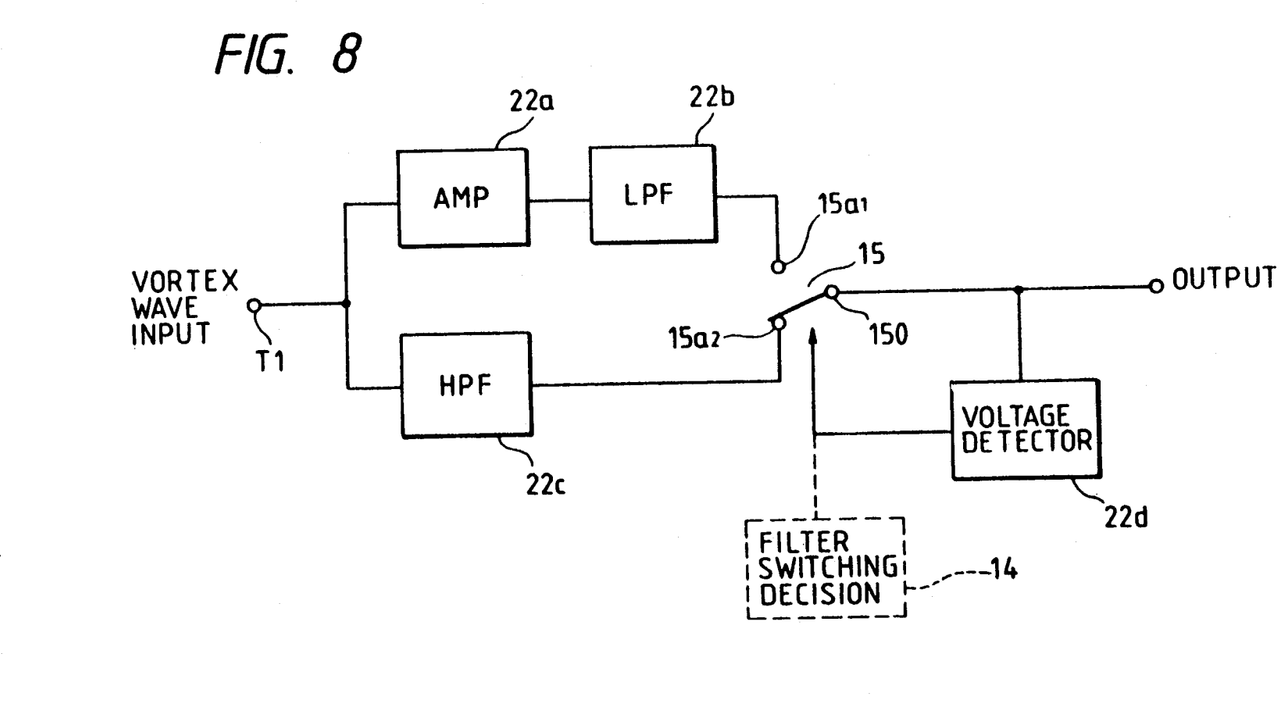
FIG. 8 is a block circuit diagram of a filter set according to another embodiment of the present invention.

FIG. 8 is a block diagram of each filter set 12 of FIG. 1 according to another embodiment of the present invention. In FIG. 8, the output of the vortex signal detection means shown in FIG. 1, i.e., the vortex signal from the output terminal of the low pass filter 11, is supplied to an input terminal T1.

The vortex signal is supplied to a fixed terminal 15a1 of the switch circuit 15 through an amplifier 22a and a low pass filter 22b.

Further, the vortex signal is applied to a fixed terminal 15a2 of the switch circuit 15 through a high pass filter 22d. The switch circuit 15 is the switch circuit shown in FIG. 1 and is switched by a combination of the filter switch decision circuit 14 and a voltage detection circuit 22d to be described later. That is, the switch circuit 15 is switched by the decision circuit 14 to select the proper or most appropriate filter set 12, and is thereafter controlled by the detector circuit 22d between terminals 15a1 and 15a2 to eliminate either noise components or beat components, respectively.

By switching a movable terminal 150 of the switch circuit 15 by means of the filter switch decision circuit 14, outputs of the low pass filter 22b and the high pass filter 22c are supplied to the waveform shaping circuit 13 shown in FIG. 1.

A voltage at the movable terminal 150 is detected by the voltage detector circuit 22d and the latter switches the movable terminal 150 of the switch circuit 15 to the side of a fixed terminal 15a2, i.e., to the side of the high pass filter 22c, forcibly.

Next, an operation of the circuit in FIG. 8 will be described. The vortex signal supplied to the amplifier 22a and amplified thereby. The amplifier 22a amplifies a small the vortex voltage obtainable when vortex frequency is low and supplies it to the low pass filter 22b.

The low pass filter 22b removes noise signals when the vortex frequency is low and supplies a noise-removed signal to a fixed terminal 15a1 of the switch circuit 15.

On the other hand, the high pass filter 22c removes beat components of the vortex signal and supplies it to the fixed terminal 15a2 of the switch circuit 15. The movable terminal 150 of the switch circuit 15 is switched by the output of the filter switching decision circuit 14 to the output of either the low pass filter 22b or the high pass filter 22c to guide it to the waveform shaping circuit 13 shown in FIG. 1.

A voltage at the movable terminal 150 of the switch circuit 15 and the output voltage of the switch circuit 15 are detected by the voltage detector circuit 22d which switches the movable terminal 150 of the switch circuit 5 to the side of the fixed terminal 15a2 (high pass filter 22c side) forcibly when the output voltage of the voltage detection circuit 22d exceeds a predetermined voltage.

A characteristic a of a combination circuit of the amplifier 22a and the low pass filter 22b and a characteristic b of the high pass filter 22d are similar to those shown in FIG. 6. As is clear from FIG. 6, the low pass filter 22b removes noise components having frequencies higher than the vortex frequency and the high pass filter 22d removes beat components having frequency lower than the vortex frequencies.

A switching of the switch circuit 15 depends upon the vortex frequency and occurs at a cross point on the characteristic curves of the low pass filter 22b and the high pass filter 22d.

Figure 9A:
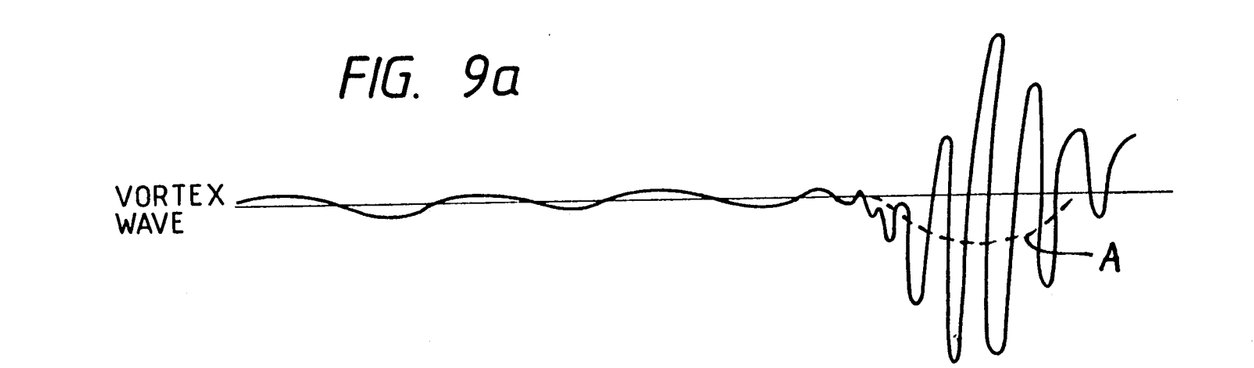
FIGS. 9A and 9B show waveforms for explanation of an operation of the filter circuit in FIG. 8.
Figure 9B:
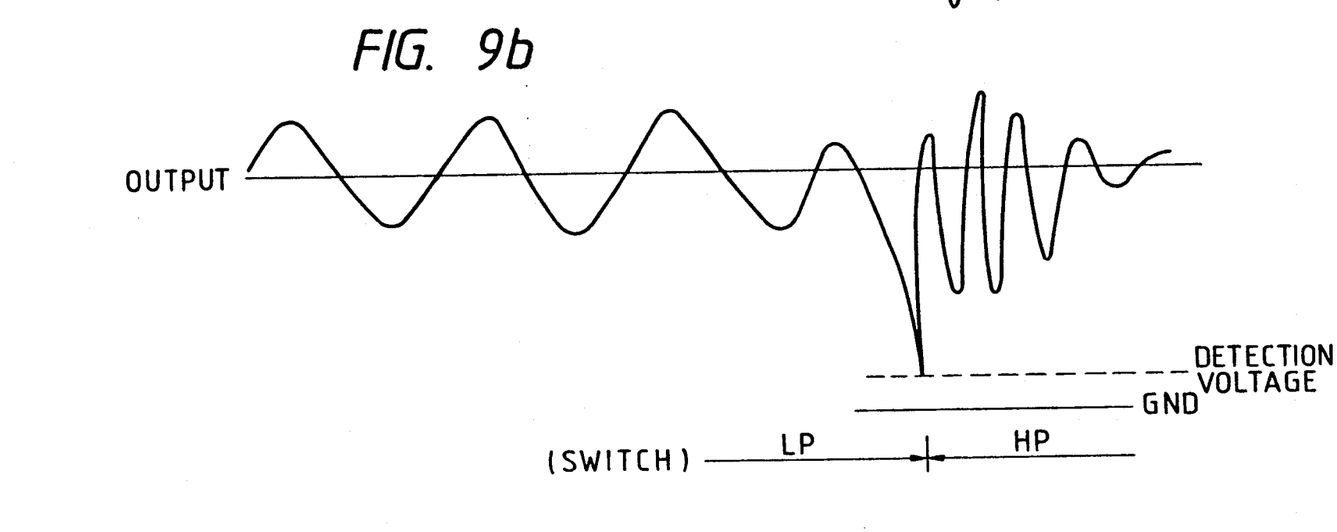

Asumming that the input vortex signal frequency becomes high and the vortex signal includes a low frequency beat component A, as shown in FIG. 9a, the beat component is amplified by the amplifier 22a and the output voltage of the switch circuit 15 tends to go down to GND as shown in FIG. 9b.

The voltage detector circuit 22d detects this voltage and switches the movable terminal 150 of the switch circuit 15 to the side of the fixed terminal 15a2, i.e., to the side of the high pass filter 22c so that its operation can follow such abrupt changes of the vortex frequency.

Since, in this embodiment, noise components of the vortex signal is removed by a low pass filter and a beat component thereof is removed by a high pass filter, an output of either the low pass filter or the high pass filter being derived by a switch circuit and, when an output voltage of the switch circuit exceeds a predetermined voltage, a voltage detection circuit causes the switch circuit to be switched to the side of the high pass filter forcibly. Therefore, it is possible to detect vortex frequency with high fidelity even when vortex frequency is increased abruptly. Further, the device itself can be inexpensive and high precision.

Figure 10:
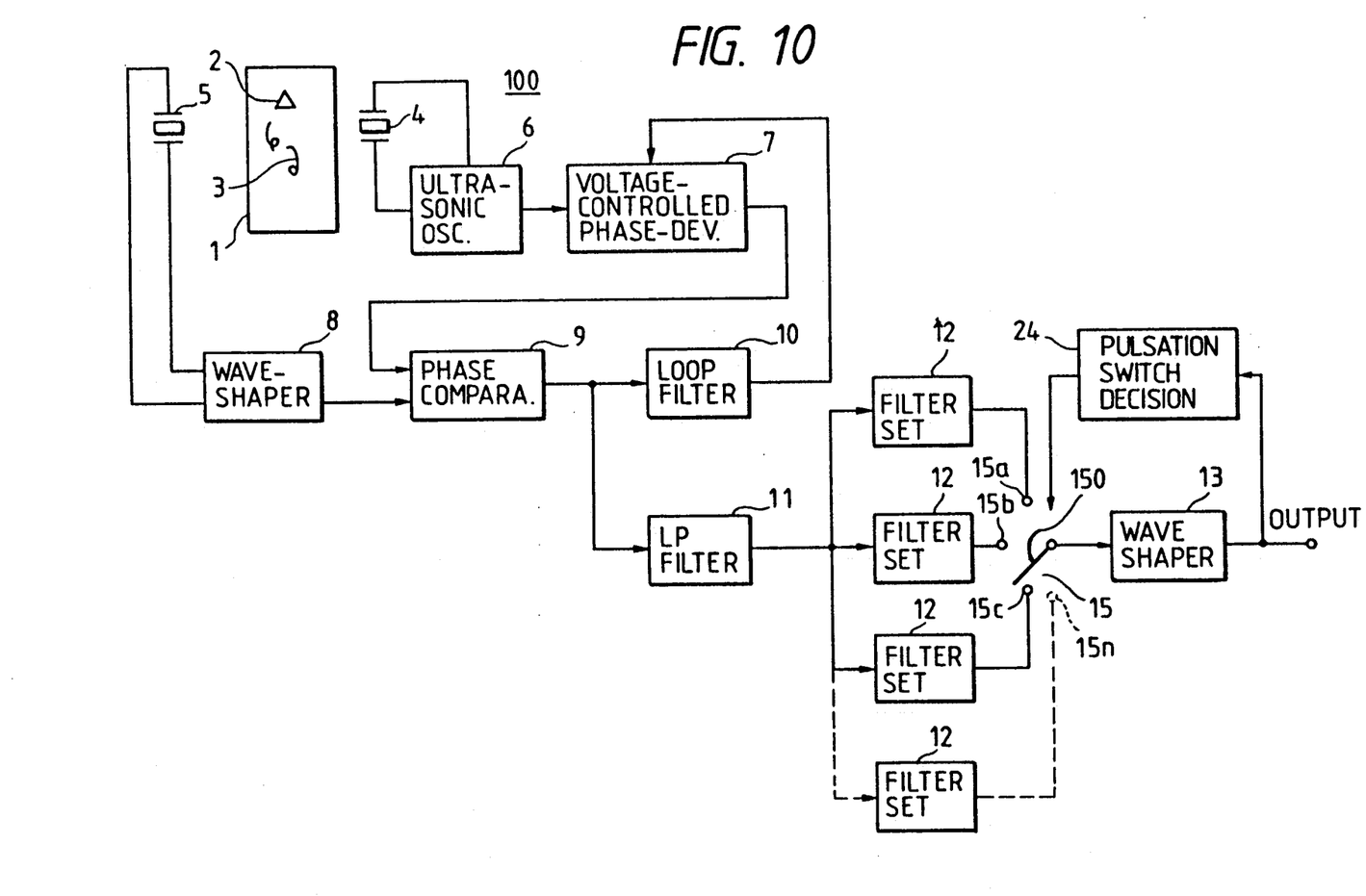
FIG. 10 is a block circuit diagram of a vortex flowmeter according to another embodiment of the present invention.

FIG. 10 shows another embodiment of the present invention, in which the filter set switch decision circuit 14 in FIG. 1 is replaced by a pulsation switching decision circuit 24.

The switching circuit 15 is switched by an output of the pulsation judge circuit 24.

In the embodiment shown in FIG. 10, the output of the filter is shaped by the waveform shaping circuit 13 to obtain the vortex frequency output and the latter is supplied to the pulsation decision circuit 24 to judge a switching of the filter. A result is supplied to the switching circuit 15.

By controlling the pass band by switching the filter sets 12 by means of the switching circuit 15, noise having frequencies other than the signal output frequency is blocked by the filter bank 12, as mentioned previously.

Figure 11:
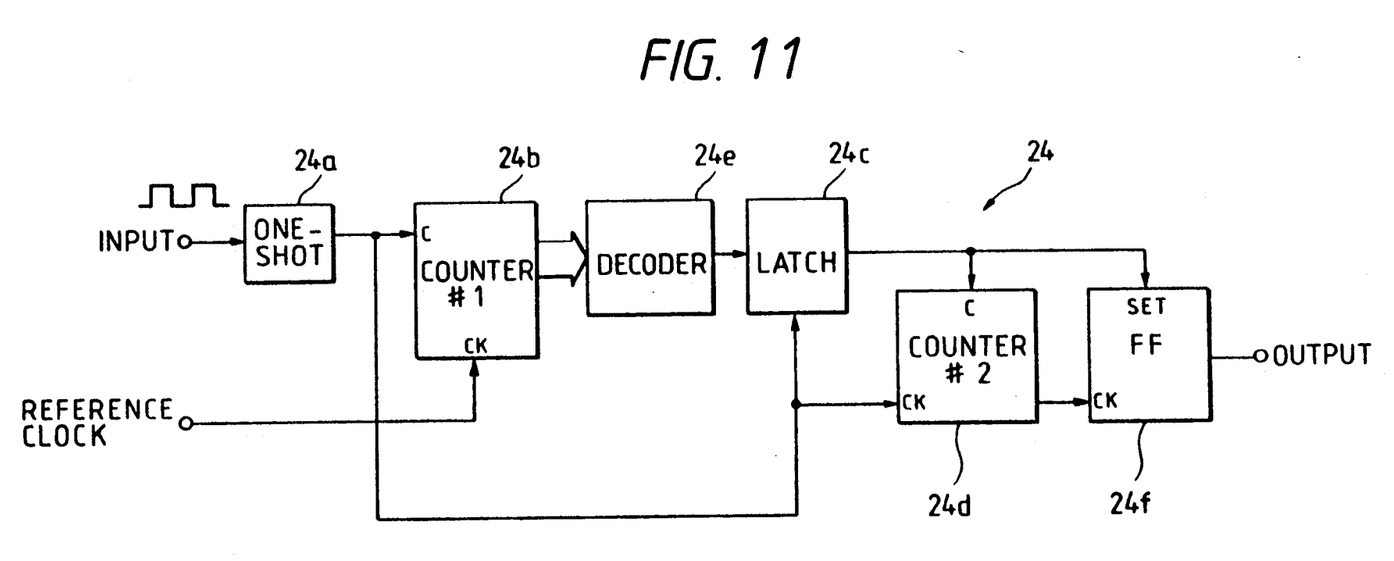
FIG. 11 is a block circuit diagram of a pulsation judge circuit of the embodiment in FIG. 10.

FIG. 11 is a block diagram of the pulsation judge circuit 24 in which 24a depicts a one-shot circuit. To this one-shot circuit 24a, a vortex signal from the waveform shaping circuit 13 shown in FIG. 10 is supplied.

The one-shot circuit 24a produces a one-shot pulse at a leading edge of the vortex signal to clear a first counter 24b. The first counter 24b counts reference clocks until it is cleared.

An output of the one-shot circuit 24a is also supplied to a latch circuit 24c and to an input terminal of a second counter 24d.

An output of the latch circuit 24c clears the second counter 24d and sets the flip-flop (FF) 24f. The FF24f receives the output of the second counter 24d as a clock.

The switch circuit 15 in FIG. 10 is switched by an output of the FF24f.

An operation of the pulsation decision circuit 24 in FIG. 11 will be described with reference to a time chart shown in FIG. 12. When a vortex signal such as shown in FIG. 12a is supplied to the waveform shaping circuit 13, the latter shapes it and supplies an output signal such as shown in FIG. 12b to the one-shot circuit 24a in FIG. 1.

Figure 12:
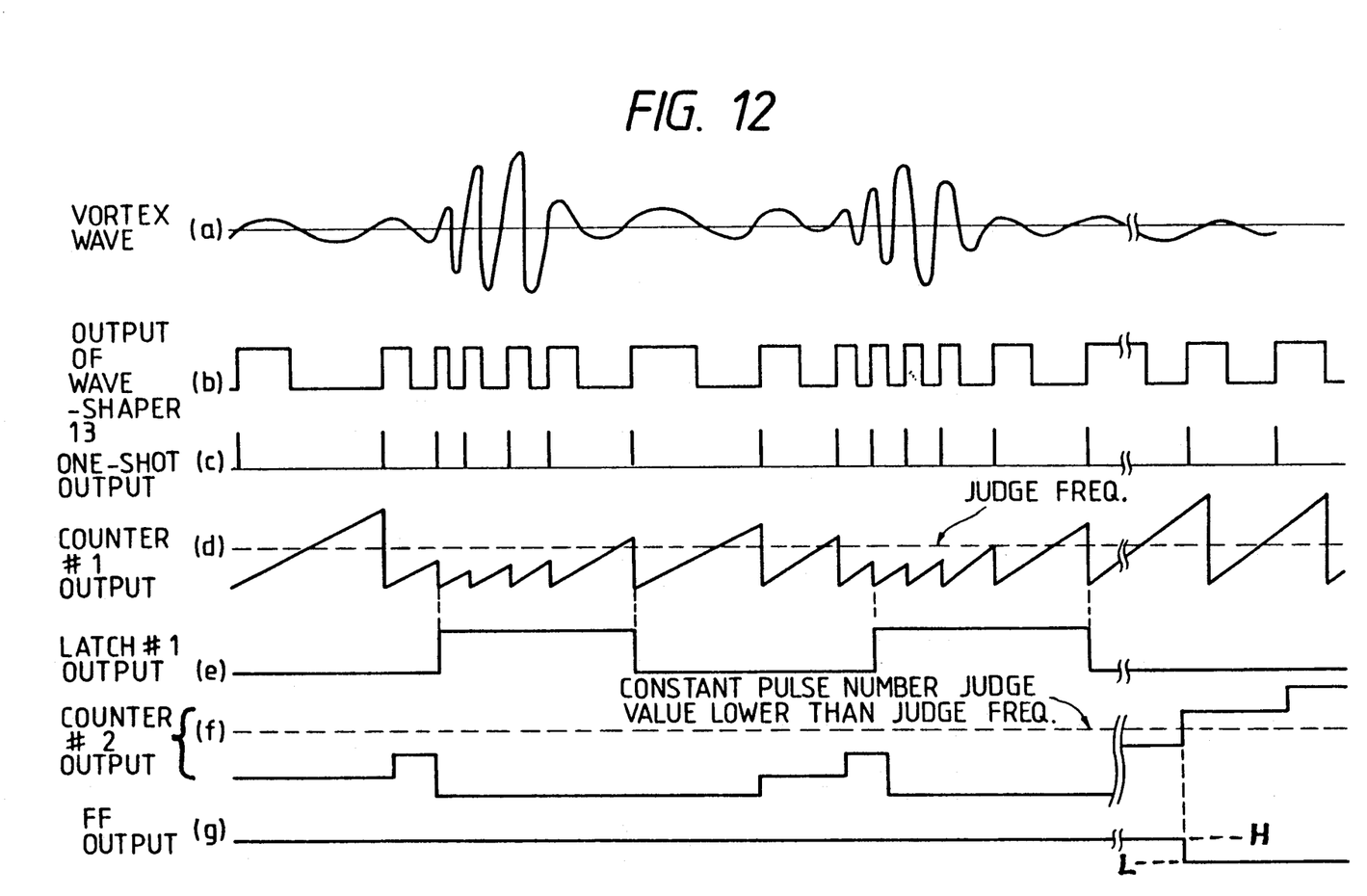
FIG. 12 shows waveforms for explanation of an oeration of the pulsation judge circuit in FIG. 11.

The output signal of the waveform shaping circuit 13 takes the form of rectangular wave as shown in FIG. 12b and the one-shot circuit 24a produces a one-shot pulse shown in FIG. 12c at the leading edge of vortex signal, i.e., the output signal of the waveform shaping circuit 13.

The one-shot pulse is used as a clear signal for the first counter 24b to which a reference clock is supplied. The first counter 24b starts to count the reference clock when it is cleared by the one-shot pulse and is cleared again with a subsequent one-shot pulse.

That is, the first counter 24b counts the period of the one-shot pulse. An output of the first counter 24b is sent to a decoder 24e. The decoder 24e decodes the output of the first counter 24b shown in FIG. 12d and its output is judged as to whether its level is higher or lower than a decision frequency.

The output from the decoder 24e is sent to the latch circuit 24c and latched thereby at a trailing edge of the one-shot pulse. An output of this latch circuit 24c is sent to the second counter 24d as a clear signal and to the FF24f as a set signal, as shown in FIG. 12e.

When the output of the latch circuit 24c is higher than the decision frequency, the FF24f produces an "H" signal regardless of other conditions (FIG. 12g). When this "H" signal is outputted, the switch circuit 15 in FIG. 10 is switched.

When the "H" signal exists, the second counter 24d is held in a reset condition by the output of the latch circuit 24c.

When the output of the latch circuit 24c becomes lower than the decision frequency, the second counter 24d starts to count one-shot pulses and, after a certain number of pulses are counted, its output is sent to the FF24f as a clock as shown in FIG. 12f to thereby cause the latter to produce an "L" signal as shown in FIG. 12g.

Table 1 below shows the logic for judging the existence and absence of pulsation.

TABLE 1

| pulsation existence | pulsation absence |
|---|---|
| output pulse of the latch circuit 22c is higher than decision frequency | condition where output pulse is lower than decision frequency and continues for a certain number of pulses |

As described hereinbefore, according to the present invention, the first counter is cleared by a one-shot pulse produced by the one-shot circuit at a leading edge of the vortex signal and counts reference clocks corresponding to a period of the one-shot pulse. The counter output is judged by the decoder as to whether it is higher or lower than the decision frequency and the result is latched by the latch circuit. When the output is higher than the decision frequency, it is judged as the existence of pulsation and the switch circuit is driven by the output of the flip-flop to switch the filter of the filter bank. When it is lower than the decision frequency, it is judged as the absence of pulsation and the flip-flop produces an "L" signal. Therefore, it is possible to switch the filter bank inserted for the removal of noise superimposed on the vortex signal, suitably.

What is claimed is:

1. A vortex flowmeter, comprising: vortex signal detection means for detecting a vortex signal produced according to a flow rate of a fluid to be measured, a plurality of filter sets (12) disposed in parallel and responsive to an output of said vortex signal detection means for removing noise and beat components therefrom, each filter set having a different frequency response characteristic, a waveform shaping circuit (13) for providing an output of one of said filter sets as a vortex frequency output, a filter set switching decision circuit (14) for measuring a frequency of said vortex frequency output and selecting a most appropriate one of the filter sets in accordance with the measured frequency, and a switch circuit (15) responsive to a selection output from said filter switching decision circuit for connecting an output of the selected filter set to the waveform shaping circuit, wherein each filter set comprises an amplifier (12a) for amplifying the detected vortex signal, a low pass filter (12b) for removing noise components from an output of said amplifier, a limiter circuit (12c) for limiting an output voltage of said low pass filter, a switch (12f) for on-off controlling an output of said limiter circuit, a high pass filter (12d) for removing beat components from the detected vortex signal, and a combiner (12e) for combining output signals of said switch and said high pass filter.

2. A vortex flowmeter, comprising: vortex signal detection means for detecting a vortex signal produced according to a flow rate of a fluid to be measured, a plurality of filter sets (12) disposed in parallel and responsive to an output of said vortex signal detection means for removing noise and beat components therefrom, each filter set having a different frequency response characteristic, a waveform shaping circuit (13) for providing an output of one of said filter sets as a vortex frequency output, a pulsation switching decision circuit (24) for detecting a pulsation of said vortex frequency output and selecting a most appropriate one of the filter sets in accordance with the detected pulsation, and a switch circuit (15) responsive to a selection output from said pulsation switching decision circuit for connecting an output of the selected filter set to the waveform shaping circuit, wherein said pulsation switching decision circuit comprises a one-shot circuit (24a) responsive to a leading edge of the output of said waveform shaping circuit to provide a one-shot pulse, a first counter (24b) for counting reference clock pulses within a period of the one-shot pulse, a decoder (24e) for determining whether an output of said first counter is higher or lower than a decision frequency, a latch circuit (24c) for latching a decision signal issued by said decoder, a flip-flop (24f) adapted to be set to actuate said switch circuit when pulsation is detected and the output of said latch circuit is higher than the decision frequency and to not actuate said switch circuit when no pulsation is detected and the output of said latch circuit is lower than the decision frequency, and a second counter (24d) adapted to be cleared when the output of said latch circuit is higher than the decision frequency and to count reference pulses and supply said flip-flop when the output of said latch circuit is lower than the decision frequency.

3. A vortex flowmeter, comprising: vortex signal detection means for detecting a vortex signal produced according to a flow rate of a fluid to be measured, a plurality of filter sets (12) disposed in parallel and responsive to an output of said vortex signal detection means for removing noise and beat components therefrom, each filter set having a different frequency response characteristic, a waveform shaping circuit (13) for providing an output of one of said filter sets as a vortex frequency output, a filter set switching decision circuit (14) for measuring a frequency of said vortex frequency output and selecting a most appropriate one of the filter sets in accordance with the measured frequency, and a switch circuit (15) responsive to a selection output from said filter switching decision circuit for connecting an output of the selected filter set to be waveform shaping circuit, wherein each filter set comprises an amplifier (22a) for amplifying the detected vortex signal, a low pass filter (22b) for removing noise components from an output of said amplifier, a high pass filter (22c) for removing beat components from the detected vortex signal, a switch circuit (15) for switching an output between said low pass filter and said high pass filter, and a voltage detector circuit (22d) for detecting an output voltage of said switch circuit to drive said switch circuit.

* * * * *